Jan. 28, 1969 R. COCKERILL 3,423,775
MEANS FOR FIXING A SEAT COVER TO A SEAT
Filed Jan. 11, 1967

INVENTOR
BY Richard Cockerill
Andrew O'Fleins
ATTORNEY

United States Patent Office 3,423,775
Patented Jan. 28, 1969

3,423,775
MEANS FOR FIXING A SEAT COVER TO A SEAT
Richard Cockerill, Blisworth, England, assignor to Bostrom Manufacturing Company Limited, Northampton, Northamptonshire, England, a British company
Filed Jan. 11, 1967, Ser. No. 608,596
Claims priority, application Great Britain, Jan. 13, 1966, 1,557/66
U.S. Cl. 5—353.1             2 Claims
Int. Cl. A47c 31/02, 27/14

ABSTRACT OF THE DISCLOSURE

A seat, particularly for a vehicle, comprising a seat pan, and a seat cover whose edge portion is folded over a lip of the seat pan and is secured by a V-section trim which grips it on to the lip, one side of the trim having an inward projection which locks over a step or other projection on the seat pan lip. The grip of the trim can be supplemented by V-shaped clips, which can have barbs thereon and which can be separate from, or integral with, the trim.

Background of invention

This invention relates to seats, in particular vehicle seats, having a cover fixed thereto, and more particularly to the means for fixing said cover.

Prior to the present invention many attempts have been made to provide an effective cover fixing method which would be effective to provide a permanent connection between the cover of the seat and the seat pan. These attempts were not fully successful in seats having a formed seat pan in which the outer edge of the seat pan was formed to a contour which would facilitate the attachment of a peripheral bead.

Summary of invention

One object of the invention is to provide an improved seat cover fixing means in the form of a trim which can be fixed to the seat pan to hold the seat cover securely in position and provide a neat smooth edge to the seat, the trim being relatively inexpensive to produce and capable of being fixed in position with minimum use of labour.

This object is attained by providing a seat pan which has a downwardly extending lip with the lip having an outwardly projecting step intermediate of the pan and the edge of the lip. A U-shaped resilient clip is provided to engage the lip and to secure the covering material which has been folded over the lip.

Other objects and advantages will be pointed out in, or be apparent from, the specification and claims, as will obvious modifications of the embodiments shown in the drawing in which:

Figure 1:
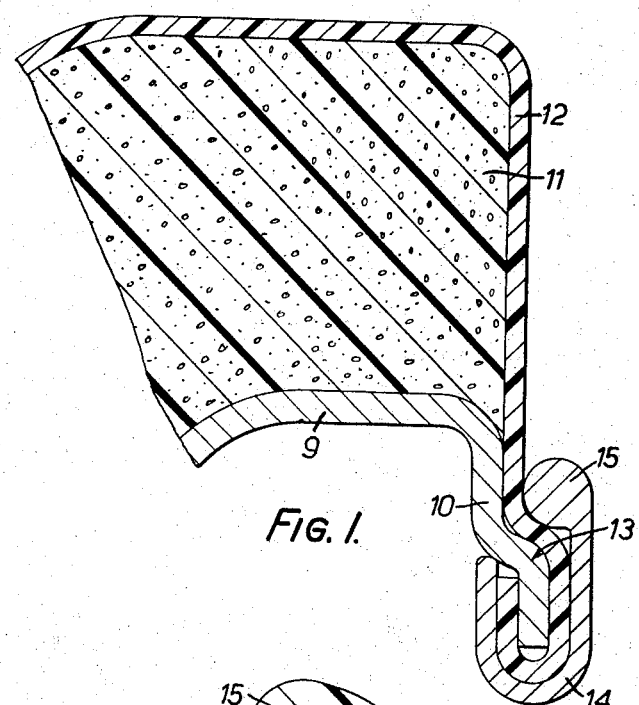
FIGURE 1 is a vertical section through an edge portion of a seat showing one form of trim for securing a cover to the seat.

Referring now to the drawings, the seat to which the present forms of trim are particularly applicable comprises a base or pan 9 having, around its edge, a lip 10 which is downwardly directed. In particular, the seat pan is a one-piece structure made of steel, metal alloy, fibre glass, PVC or other suitable material, in which the lip is integral with the remainder. The seat pan will normally be covered by a seat cushion in the form of a pad 11 of foamed plastic or foamed rubber, and the seat cover 12, after positioning on the cushion, will be held in place by wrapping the edge portion of the seat cover over the lip of the seat pan and securing it in this position.

In order to secure the edge of the seat cover in position, a projection in the form of a step 13 is formed along the seat lip, spaced from the edge of the lip, in particular the portion of the lip below the step lying outward of the portion of the lip above the step, and a seat trim 14 is fitted onto the seat lip to lock over the step, the seat trim being in the form of a beading strip which extends around the periphery of the seat.

The trim is of U or V section and the outer side of the trim adjacent the seat lip step has an inwardly directed projection 15 forming a hook for engagement over the seat lip step.

In fitting the trim to the seat lip, the trim is placed astride the edge of the seat lip and the folded edge portion of the cover thereon, with the side of the trim having the inward projection 15 disposed adjacent the side of the lip formed with the outward step 13, and the trim is then pressed on to the lip until the inward projection 15 has snapped over the seat lip step 13.

The edge of the trim, opposite to that formed with the inward projection, is rounded off to prevent damage to the seat cover as the trim is pushed into position.

Figure 2:
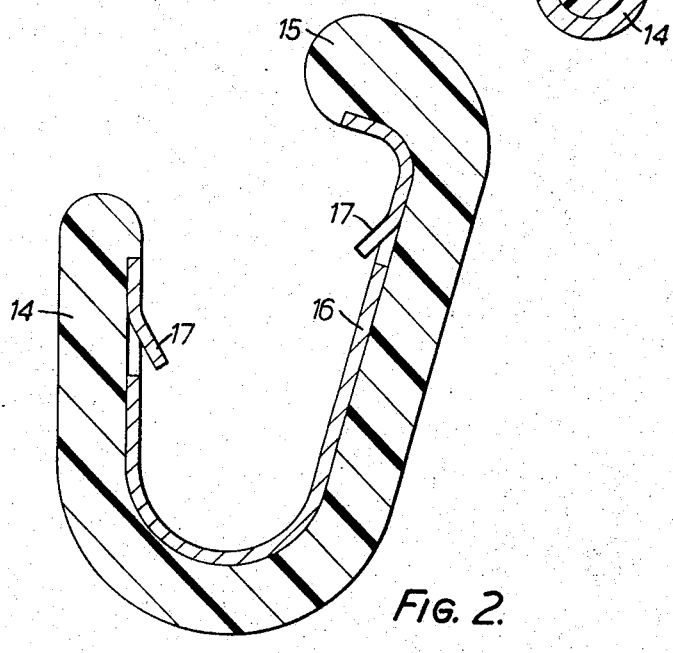
FIGURE 2 is a vertical section, on an enlarged side, of a modified form of trim.

If the trim is made of a plastic or other material having insufficient resilience to grip the cover on to the seat lip, the gripping effect of the trim can be reinforced by the application of material more resilient than that of the trim strip. This can be effected, as shown in FIGURE 2, by the use of highly resilient U or V shaped clips 16, made for example of spring steel, incorporated in the trim strip and spaced apart along the length of the strip. These spring clips can be moulded into the trim strip, or can be fitted over the folded edge of the seat cover before application of the trim strip. Such spring clips can be formed with barbs 17 to bite into the seat cover edge, or preferably to bite through the seat cover and into the seat lip. The spring clips can extend upwardly over the projection on the seat lip, or can terminate below the projection.

The trim, in each of its forms described above, can be made of aluminium, plastic or any other suitable material having sufficient resilience to snap over the seat lip projection or projections. The trim can be made as an extrusion, or folded from flat strip, or rolled from strip, and can be used in a single length with one peripheral joint, or in two or more lengths with corresponding joints. Preferably the strip is preformed to the outline of the seat lip so that it can be more easily snapped into position. The joins between sections of the trim strip can be concealed by fitting over them a suitable spring cover clip. Alternatively the joins can be welded, brazed, glued or otherwise sealed to prevent the entry of water into the trim section, and the trim itself can be sealed to the cover on the inside and outside faces to exclude water.

The inherent spring grip of the cover on the seat lip may be sufficient to prevent water or other liquids from penetrating between the cover and the seat lip, but preferably the cover is glued, bonded or otherwise sealed to the seat lip.

Although only two embodiments of the present invention have been illustrated and described, it will be apparent to those skilled in the art that various changes and modifications may be made therein without departing from the spirit of the invetnion or from the scope of the appended claims.

I claim:
1. A vehicle seat comprising:
    a seat pan, said pan having an integral and downwardly extending peripheral lip with said lip having an outwardly extending step intermediate the body of said pan and the end section of said lip, and the end sec- tion of said lip being straight and downwardly directed;

a seat cover material extending over the edge of said lip and its end section and being folded over the edge of said end section and covering the inside face of said end section;

a resilient trim having a U-shaped cross section with both of its legs being generally straight and with one of its legs being longer than the other and terminating in an inwardly extending projection which engages the material covered lip just above said step; the other and shorter leg of said U-shaped trim engaging the material covered inside face of said end section and terminating just below said step.

2. A seat trim according to claim 1 having a plurality of U-shaped spring clips, of higher resilience than that of the trim, spaced apart along the trim.

References Cited

UNITED STATES PATENTS

| 1,544,873 | 7/1925 | Trimble | 5—353.5 |
| 1,594,282 | 7/1926 | Trimble | 5—353.2 |
| 2,347,538 | 4/1944 | Bloomberg | 5—353.5 |
| 2,583,702 | 1/1952 | Meyer | 5—353.1 X |
| 2,760,562 | 8/1956 | Fisher | 5—353.1 |
| 3,222,769 | 12/1965 | LePlae | 52—716 |
| 3,307,309 | 3/1967 | Bloxsom | 52—716 |
| 3,310,928 | 3/1967 | Weimar | 52—716 |

FOREIGN PATENTS 820,467  9/1959  Great Britain.

FRANCIS K. ZUGEL, *Primary Examiner.*

U.S. Cl. X.R.

297—218